US005483529A

United States Patent [19]
Baggen et al.

[11] Patent Number: 5,483,529
[45] Date of Patent: Jan. 9, 1996

[54] RECEIVER

[75] Inventors: Constant P. M. J. Baggen; Arie G. C. Koppelaar, both of Eindhoven, Netherlands

[73] Assignee: U.S. Philips Corporation, New York, N.Y.

[21] Appl. No.: 190,978

[22] Filed: Feb. 3, 1994

[30] Foreign Application Priority Data

Feb. 8, 1993 [EP] European Pat. Off. .............. 93200346

[51] Int. Cl.$^6$ ..................................................... H04B 1/74
[52] U.S. Cl. .............................. 370/70; 375/233; 375/260
[58] Field of Search .................................. 370/6, 50, 69.1, 370/70, 112, 123; 375/11, 12, 14, 38, 229, 230, 260, 232, 233; 455/61, 295; 348/21, 388, 487, 614, 914

[56] References Cited

U.S. PATENT DOCUMENTS

| | | | |
|---|---|---|---|
| 4,785,447 | 11/1988 | Ichiyoshi | 370/70 |
| 5,191,576 | 2/1993 | Pommier et al. | 370/69.1 |
| 5,196,936 | 3/1993 | Kobayashi et al. | 348/614 |
| 5,228,025 | 7/1993 | Le Foch et al. | 370/70 |
| 5,267,041 | 11/1993 | Matsunaga | 348/614 |
| 5,321,512 | 6/1994 | Huang | 348/614 |

OTHER PUBLICATIONS

Bingham, A. C., "Multicarrier Modulation for Data Transmission: An Idea Whose Time Has Come", IEEE Communications Magazine, May 1990, pp. 5–14.

Qureshi, "Adaptive Equalization", Proceedings of the IEEE, vol. 73, No. 9, Sep. 1985, pp. 1349–1387.

*Primary Examiner*—Benedict V. Safourek
*Attorney, Agent, or Firm*—Edward W. Goodman

[57] ABSTRACT

Receiver for receiving a transmission signal comprising N frequency multiplexed data modulated carriers, having a good compromise between insensitivity to multipath reception and receiver complexity, and which may enable a reduction in transmission bandwidth and transmitter power. In such a receiver, modulation signals of the carriers are supplied by a frequency multiplex demodulator to a symbol detection device via an equalizer device. The equalizer device compensates distortion in the modulation signals supplied thereto, such that the symbol detection device may detect the transmitted data with reduced error probability. When the transmission signal reaches the receiver with different delay times, this distortion is mainly a kind of cross-talk between the modulation of adjacent carriers. Therefore substantial compensation is achieved by combining the modulation signal of a carder with signals representative of the data of the adjacent carriers. In the receiver, these signals may be obtained from the multiplex signal path between the frequency multiplex demodulator output and the output of the symbol detection device.

9 Claims, 6 Drawing Sheets

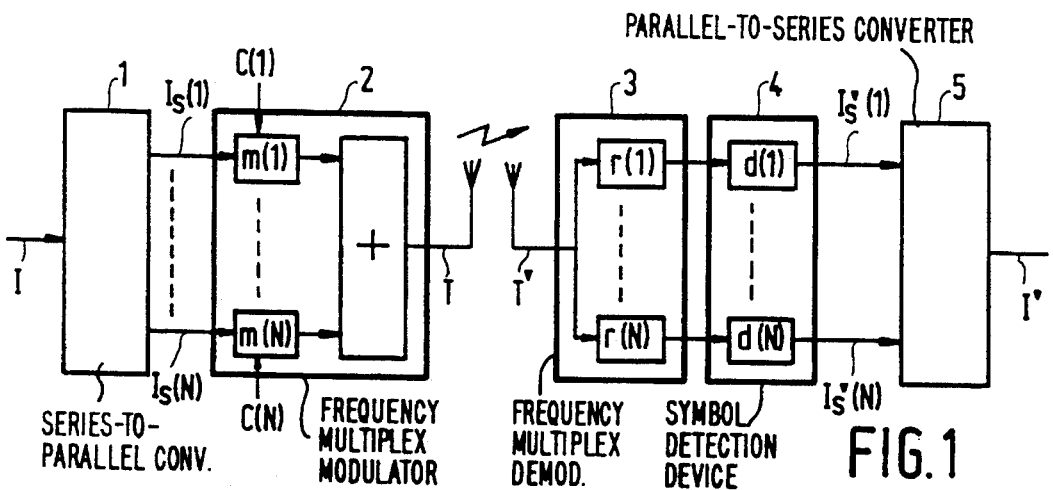
FIG. 1
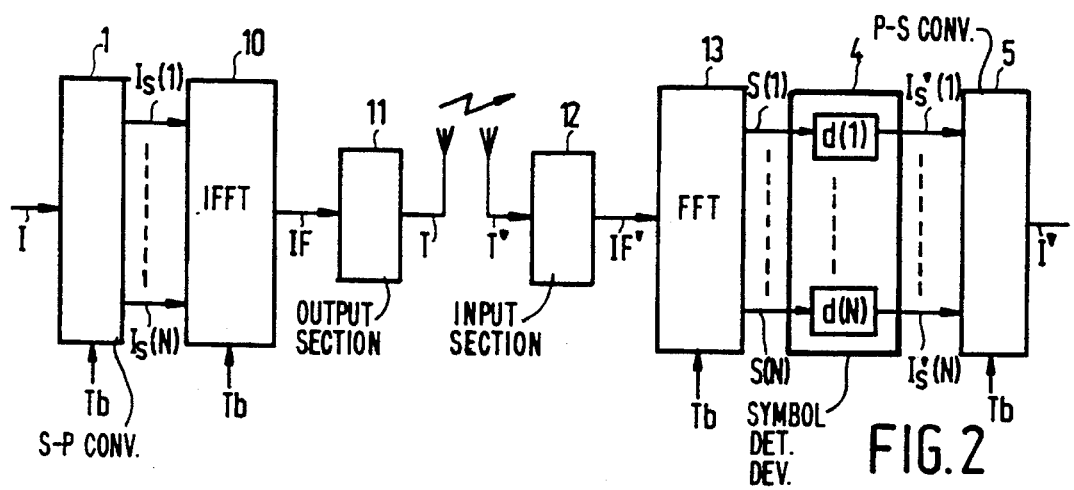
FIG. 2
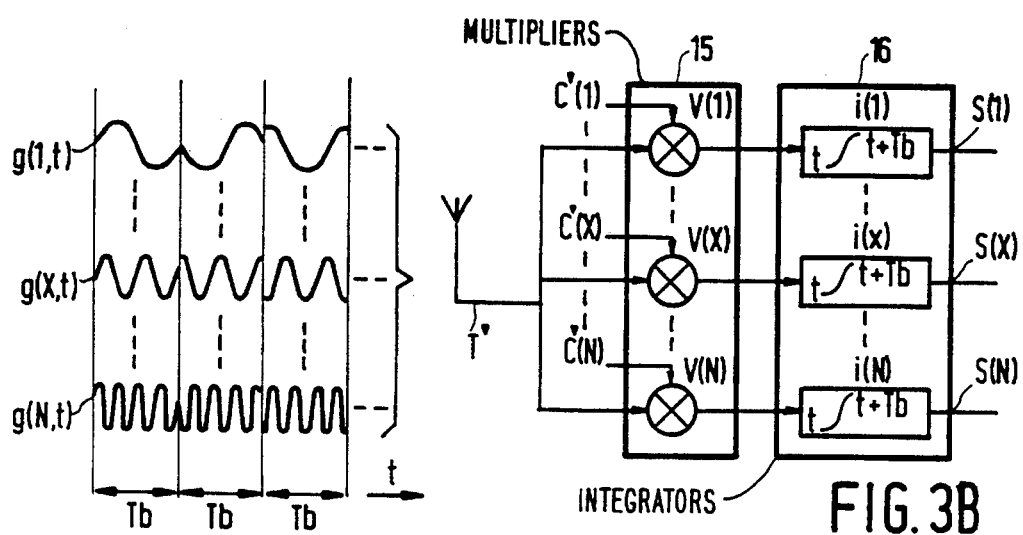
FIG. 3A
FIG. 3B

RECEIVER

BACKGROUND OF THE INVENTION

1. Field of the Invention

The invention relates to a receiver for receiving a transmission signal comprising a plurality of (N) frequency multiplexed data modulated carriers, said receiver comprising a frequency multiplex demodulator and a data recovery device having an input for receiving modulation signals of said careers from the frequency multiplex demodulator, and an output for supplying recovered data to further signal processing devices, and having a multiplex data recovery signal path between said input and said output for carrying a multiplex signal having N signal components, each component representing the data of an individual carrier, and having an equalization device and a symbol detection device subsequently arranged in the multiplex signal path.

2. Description of the Related Art

A receiver of this type is known, inter alia from "Multicarrier Modulation for Data Transmission: An Idea Whose Time Has Come", "IEEE Communications Magazine", May 1990, pp. 5 to 14, by John A. C. Bingham.

The known receiver is suitable for receiving audio and/or video information coded and transmitted in a digitized form, hereinafter to be referred to as "data". An example of use is "Digital Terrestrial Television Broadcasting" (DTTB), the future video version of "Digital Audio Broadcasting" (DAB). However, the receiver may alternatively be used in modems for receiving digital information transmitted through cables such as glass fibres, coaxial and multi-core cables for telephony.

In data transmission, the aim is to adapt transmitter(s) and receiver(s) in such a way that the transmission at a given data rate, expressed in bits per second, has a sufficiently low error level, with a favorable exchange between the spectral bandwidth required for transmission and the power of the transmitter. In this respect it should be taken into account that the properties of the transmission channel may vary with time and that these properties may be different for each receiver location.

The afore-mentioned aim is notably important in DTTB and DAB systems. For example, in DTFB, (high-definition) video data may be transmitted within the frequency bands of the present-day analog terrestrial television transmitters. Preferably, the bandwidth required for transmitting the video data should comply with the current channel spacing in these frequency bands, which limits the bandwidth to approximately 7 to 8 MHz. The transmitter power required for the area of coverage should be kept as small as possible so as to limit interferences with analog video signal transmissions. It is also desirable that the technically and/or economically realizable transmitter power covers a maximum possible area.

To limit interferences by and bandwidth coverage of digital video transmissions to a considerable extent, a "single frequency network" (SFN) is considered. The principle of SFN is that various transmitters transmit the same program package at one and the same carrier frequency. These various transmitters are then spread over the desired area of coverage.

A problem in data transmission is that when the received signal is distorted, a larger signal-to-noise ratio at the receiver input is required for regaining the transmitted data substantially without any errors. In the worst case, the distortion is such that the transmitted data cannot be regained or can hardly be regained.

The received signal is notably distorted because the transmitted signal reaches the receiver with different delay times. The first reason is that there are various signal paths between transmitter and receiver in practice, for example, due to reflections of radio signals against objects (such as mountains and buildings). The second reason is an SFN in which delay time differences are produced because transmissions from various sources are received. The delay time differences are dependent on the position of the transmitters with respect to the source and dependent on the position of the receiver with respect to the transmitters.

In the case of delay time differences, the received signal is a sum of undistorted transmitted signals having varying amplitudes, which undistorted signals are shifted in time with respect to each other. The strongest signal in this sum can be considered as the main signal, with leading and trailing echoes. If the transmitted signal is modulated on a carrier with a series of symbols, the modulation of the received signal during a symbol period Ts of an arbitrary symbol will be disturbed by the carrier modulation of previous or possibly subsequent symbols. This form of distortion is referred to as Inter-Symbol Interference (ISI).

The number of previous and subsequent symbols which may disturb a symbol from the received data stream is dependent on the delay time differences in the channel in relation to the symbol frequency Fs. The error probability in the receiver increases with the number of symbols covered by the ISI in the case of a given signal-to-noise ratio of the received signal.

By reducing the symbol frequency Fs, the number of symbols covered by the ISI, as well as the transmission bandwidth decrease. If the quantity of data to be transmitted per unit of time (numbers of bit/s) is to be maintained simultaneously, the factor by which the symbol frequency is decreased will have to be equal to the factor by which the collection of possible symbol values is increased. By increasing the number of possible symbol values, the error probability increases at a given signal-to-noise ratio of the received signal.

In wireless data transmission of, for example video information, delay time differences are a considerable problem. An example is the transmission of data rates of approximately 10 megabits per second through channels having delay time differences increasing to several tens of microseconds. In the case of bivalent symbols ("0" and "1") and a symbol frequency of 10 million per second, the ISI covers several hundred symbols. At a symbol frequency of 10,000 per second the ISI is exclusively limited to the subsequent and/or previous symbol, but there are 1000 possible symbol values (10 bits).

"Multicarrier Modulation" (MCM) is a known technique of adapting transmitters and receivers for transmission via a channel having delay time differences. It provides a flexible exchange between the error probability, required transmission power and bandwidth. MCM is described, for example by John A. C. Bingham in "IEEE Communications Magazine", May 1990, pp. 5 to 14.

FIG. 1 shows an MCM data transmission system. At the transmitter end, a serial-to-parallel converter 1 divides a data stream I into N sub-data streams Is(1) . . . Is(N) having a symbol frequency which is a factor of N lower than the first-mentioned data stream. In a frequency multiplex modulator 2, which comprises a system of modulators m(1) . . . m(N), each sub-data stream Is(1) . . . Is(N) modulates a carrier c(1) . . . c(N) at the frequency f(1) . . . f(N), respectively. The transmitted signal T consists of the addition of all modulated carriers.

At the receiver end, the carriers present in the received signal T' are demodulated in a frequency multiplex demodulator 3 which comprises a system of demodulators r(1) ... r(N). These demodulators are coupled to the symbol detectors d(1) ... d(N), respectively, which form part of a symbol detection device 4. The outputs of the symbol detectors d(1) ... d(N) supply the sub-data streams Is' (1) ... Is'(N), respectively. These sub-data streams are combined to a data stream I' by means of a parallel-to-serial converter 5. In the case of transmission without errors, data stream I' will be fully correlated with the transmitted data stream I.

In this technique, it is important that there is no crosstalk between modulation signals of separate carriers, because this may inhibit a flawless reception. Symbols from an arbitrarily chosen sub-data stream Is(x) which modulates carrier c(x) should exclusively contribute to the modulation signal from demodulator r(x) in the receiver.

MCM provides the possibility of choosing the split-up by a factor N of a data stream I to be transmitted into sub-data streams Is(1) ... Is(N) in such a way that the symbol period in the sub-data streams exceeds the maximum delay time difference in the transmission channel. With a suitably chosen time window, it will then be possible at the receiver end to detect the symbols in the sub-data streams free from ISI.

A practical realization of MCM is also presented by John A. C. Bingham in "IEEE Communications Magazine", May 1990, pp. 5 to 14 and is also known in literature as "Orthogonal Frequency Division Multiplex" (OFDM).

In an OFDM transmitter, shown in FIG. 2, frequency multiplex modulation is effected in a digital signal processor: an N-point Inverse Fast Fourier Transformer (IFFT) 10. N stands for the number of frequency-multiplexed signals. The output of the IFFT 10 supplies the digital baseband signal IF and may be coupled to an output section 11 which is further coupled to the transmission channel. In the case of radio transmission, the output section 11 converts the digital baseband signal into an analog high-frequency signal T. To this end, the output section 11 may comprise, for example, D/A converters, filters, mixer stages and oscillators.

An OFDM receiver has an input section 12 which is coupled to a digital signal processor, being an N-point Fast Fourier Transformer (FFT) 13, which FFT 13 is further coupled to a symbol detection device 4. Input section 12 converts the received analog high-frequency signal into a digital baseband signal IF' and to this end it may comprise, for example, A/D converters, filters, mixer stages, oscillators and tuning circuits. The FFT 13 is a frequency multiplex demodulator.

At the transmitter end, a new group of N symbols from the data stream I is presented to the N inputs of the IFFT 10 in successive periods of time Tb. The IFFT 10 transforms the position-sequential group of N symbols to a time-sequential group of N symbols covering a period of time Tb. Consecutive groups of N symbols associated with consecutive transforms of IFFT 10 constitute the signal IF which is applied to the output section 11.

In the receiver, the output signal IF' of the input section 12 comprises time-sequential groups of N numbers which may be allocated to the respective time-sequential groups of N symbols in signal IF of the transmitter. The received time-sequential groups of N numbers are convened in consecutive periods of time Tb into N position-sequential numbers by the FFT 13. The N position-sequential numbers constitute the respective input signals for the N symbol detectors of the symbol detection device 4, which detectors supply the received N position-sequential symbols.

In essence, a data stream I is transformed to a data stream IF in the transmitter, which transform is performed in groups for N symbols in successive periods Tb. Characteristic of this transform is that each symbol from data stream I, covering time Tb/N and being associated with a group of N symbols, is proportionally allocated to each symbol from the transformed group of N symbols in data stream IF covering time Tb. In other words: the data of a symbol from data stream I, concentrated in a time Tb/N, are spread over a time Th in data stream IF. The aforementioned transform is inversely performed in the receiver. Here, the data of N symbols spread and transmitted over a period of time Tb is converted again into N time-sequential symbols each having a symbol period of Tb/N.

The output signal T of the output section 11 in the OFDM transmitter can be considered as a group of modulated carriers c(1) ... c(N) having equidistant frequency spacing of fr=1/Tb covering f(1) to f(N). The modulation signal of carrier c(x) at frequency f(x) originates from sub-data stream Is(x).

The output signal T of the output section 11 in the OFDM transmitter may be further considered as systems of N different wave packets g(1,t) ... g(N,t) which succeed each other with a period Tb. This is shown in FIG. 3A. In the period Tb, the wave packets comprise an undistorted sine-shaped waveform whose frequency for the series of wave packets g(x,t) is equal to f(x). The amplitude and/or phase of a wave packet g(x,T) is dependent on the value of a symbol from the sub-data stream Is(x) at instant T.

The input section 12 in combination with the FFT 13 in the receiver can be considered as a system of N multipliers 15 v(1) ... v(N), preceding a system of N integrators 16 i(1) ... i(N), shown in FIG. 3B. The output of multiplier v(x) is coupled to the input of integrator i(x). The received signal appears at the first input of multiplier v(x); the second input of v(x) is controlled by carrier c'(x) at a frequency which is substantially equal to f(x). An undistorted wave packet from the series g(x,t) exclusively yields an output signal at the output of integrator i(x) if the integration period is equal to Tb. In other words: there is no crosstalk between modulation signals of different carriers.

In the case of delay time differences in the transmission channel, the received wave packets are distorted. Within the period of a wave packet, amplitude and/or phase jumps occur due to lagging or leading transitions between consecutive wave packets. Amplitude and/or phase jumps within the afore-mentioned integration period Tb produce output signals at various integrators. A series of wave packets g(x,t), distorted by leading and/or trailing echoes, produces signal values which are unequal to zero at the outputs of integrators other than i(x).

Delay time differences in the channel not only cause crosstalk at the FFT outputs between modulation signals of separate symbols within a sub-data stream, but also crosstalk between those of symbols of different sub-data streams. Thus, there is crosstalk in "time" as well as in "frequency".

A method of inhibiting the inter and intra-sub-data stream crosstalk is to increase the period of time of a wave packet by a "guard" time Tg which is longer than the maximum delay time differences in the transmission channel. The effective symbol period of the sub-data streams is increased to a time Ts=Th+Tg. Within a given chosen time window of length Tb, the received wave packets will be undistorted, i.e. they will have a sine-shaped waveform without amplitude and/or phase jumps. There will be no crosstalk in the output signals of the integrators at an integration period in conformity with this time window. Delay time differences do change the phase and/or amplitude of a wave packet, hence the represented symbol value. This does not cause any problem if the data is stored in the value difference between two consecutive symbols. The reference levels of the symbol detectors can also be adapted with a training cycle in the transmitted signal so that the phase and/or amplitude changes of a wave packet are compensated for.

Increasing the symbol period by a guard time Tg has the drawback that the symbol frequency per sub-data stream decreases by a factor $F=(Tg+Tb)/Tb$. At an equal bandwidth and an equal number of values per symbol, the transmission capacity also decreases by the factor F. The advantage of insensitivity to delay time differences in the channel is accompanied by the drawback of a less favorable exchange between bandwidth and required signal power.

The afore-mentioned drawback can be alleviated by choosing the factor N of splitting up a data stream I into N sub-data streams to be larger so that Tb will be larger than Tg. In itself, this measure has drawbacks. Firstly, if N is increased, the complexity of the FFT and IFFT circuits in particular will increase. Secondly, if Tb is increased, the requirements imposed on the (instantaneous) frequency accuracy of the oscillators used in the input section 12 will be more stringent with respect to the carriers in the OFDM signal. These requirements may be so stringent that the oscillators cannot be realized, or that they will become very expensive. The frequency accuracy requirements also restrict the rate at which transmitter and receiver move with respect to each other due to the Doppler effect.

Due to the afore-mentioned practical restrictions of increasing the factor N, the use of a guard time may result in a considerable loss of transmission efficiency. This notably applies to transmission with carriers of a very high frequency, such as in the UHF television bands and/or in the case of large delay time differences occurring, for example in an SFN.

SUMMARY OF THE INVENTION

It is an object of the invention to realize a receiver in which a minimal transmitter power is required for transmitting data of, for example, video and/or audio information through a channel having delay time differences and/or in which a minimal bandwidth is required for a given data transmission rate and for a given maximum permissible error probability rate in the received signal.

According to the invention, the receiver as described in the opening paragraph is characterized in that the equalization device comprises combining means for combining a modulation signal of a carrier with a group of (M) signal components representing the data of M careers frequency adjacent to said carrier, M being substantially smaller than N, for supplying the combined signal components to the symbol detection device, such as to recover the data modulated on said carrier.

The invention is based on the recognition that the distortion in the modulation signal of carder $c(x)$ supplied by the frequency multiplex demodulator, due to delay time differences in the transmission channel, is substantially correlated with the data modulated on carriers frequency adjacent to carries $c(x)$. In the equalizing device, the distortion is compensated, such as to decrease the error probability in the recovered data, using signals available in the data recovery device representing said data. These signals may be scaled modulation signals of frequency adjacent carders supplied by the frequency multiplex demodulator (feedforward equalization) and/or scaled output signal components of the symbol detection device, representing the data of frequency adjacent carriers.

A receiver according to the invention is notably suited for receiving transmission signals comprising a great many number of carriers, like DAB or DTTB signals. Because it is recognized that out of a great many signal components representative of the data modulated on the great many of frequency multiplexed carriers, only a limited number of these signal components are needed to substantially compensate the distortion in a modulation signal, a good compromise between receiver complexity, on the one hand, and receiver insensitivity to multipath reception, on the other hand, is achieved. If all available signal components would be used to compensate the distortion in a modulation signal, the equalizing device complexity would in many cases prohibit any practical use.

FIG. 4 illustrates the afore-mentioned recognition on which the invention is based. FIG. 4 shows the computed ratio between symbol and distortion energy (in decibels on the vertical axis) in a signal at an output $s(x)$ of the frequency multiplex demodulator, from which ratio the distortion originating from modulation signals of M most adjacent carriers of low frequency and M most adjacent carriers of high frequency with respect to carder $c(x)$ has been subtracted (on the horizontal axis). For each computed ratio in FIG. 4, the distortion which is correlated with the modulation signal of carrier $c(x)$ itself (the ISI) has also been subtracted. The computation is based on a noiseless OFDM signal having 1024 carriers on which one echo is present. The echo amplitude is ¼ of that of the main signal. At each value of M the echo time is chosen to be such that the afore-mentioned ratio is minimal.

The afore-mentioned aspect is further based on the recognition that in addition to the strength of the echoes, the distortion due to mutual crosstalk of modulation signals also depends on the echo time with respect to the symbol period. An echo time of approximately half the symbol period yields a significant crosstalk. However, the amplitude of the crosstalk decreases considerably as the carrier frequency differences of the modulation signals increase. The distortion of a modulation signal on carrier $c(x)$ will then be substantially correlated with modulation signals of carriers having small frequency differences with respect to $c(x)$. On the other hand, an echo having a time of 1/100 Ts will only cause a very small crosstalk which decreases to a lesser extent with increasing carder frequency differences.

A receiver according to the invention renders an acceptable data reception possible, imposing fewer requirements on the transmitter power and/or the transmission bandwidth than when using a guard time. With a slight increase of complexity, the receiver is notably much more insensitive to signal distortion due to relatively long echo times. In contrast, it is exactly at long echo times that the use of the known guard time imposes stricter requirements on the transmitter power and/or the bandwidth. With the receiver according to the invention the guard time may be dispensed with or reduced to a considerable extent. The symbol frequency at which the carriers of an OFDM signal are modulated may thus be equal to or almost equally large as the frequency difference between the consecutive carriers.

The receiver according to the invention may be further realized in a simpler manner and at lower cost. In the known case, the required transmission efficiency and the required increase of the symbol period determines the number of N sub-data streams into which the data stream to be transmitted is split up. When the invention is used, this factor N may be smaller because inter and intra-sub-data stream crosstalk is suppressed to a considerable extent. A first advantage of a smaller factor N is that the FFT comprises a smaller number of switching elements. A second advantage is that the frequency accuracy requirements imposed on the oscillators in the input section 12 are less stringent. This is very important, particularly for receivers of OFDM signals in the UHF band or higher bands.

With a factor of N being given, the requirements imposed on the relative frequency accuracy will be more stringent as the carder frequencies increase. For the known receiver, this may have the result that one or more oscillators in the input section 12 can no longer be realized, or at least cannot be realized at an acceptable cost.

The receiver according to the invention further reduces the costs of an SFN for terrestrial transmission of data originating from, for example video information. A smaller number of transmitters is required within the area of coverage and/or the overall required transmission power is lower. The maximum echo times increase with a smaller transmitter density. If the invention is not used, with the factor N and the bandwidth of the OFDM signal being given (approximately 8 MHz to comply with the current spacing for analog terrestrial TV-transmission), a video data transmission will require more symbol values. More transmission power is then also required for the same area of coverage.

BRIEF DESCRIPTION OF THE DRAWINGS

FIG. 1 shows an MCM data transmission system.

FIG. 2 shows an OFDM data transmission system.

FIG. 3A shows the OFDM signal to be received, and

FIG. 3B shows the OFDM receiver.

DESCRIPTION OF THE PREFERRED EMBODIMENT

Figure 4:
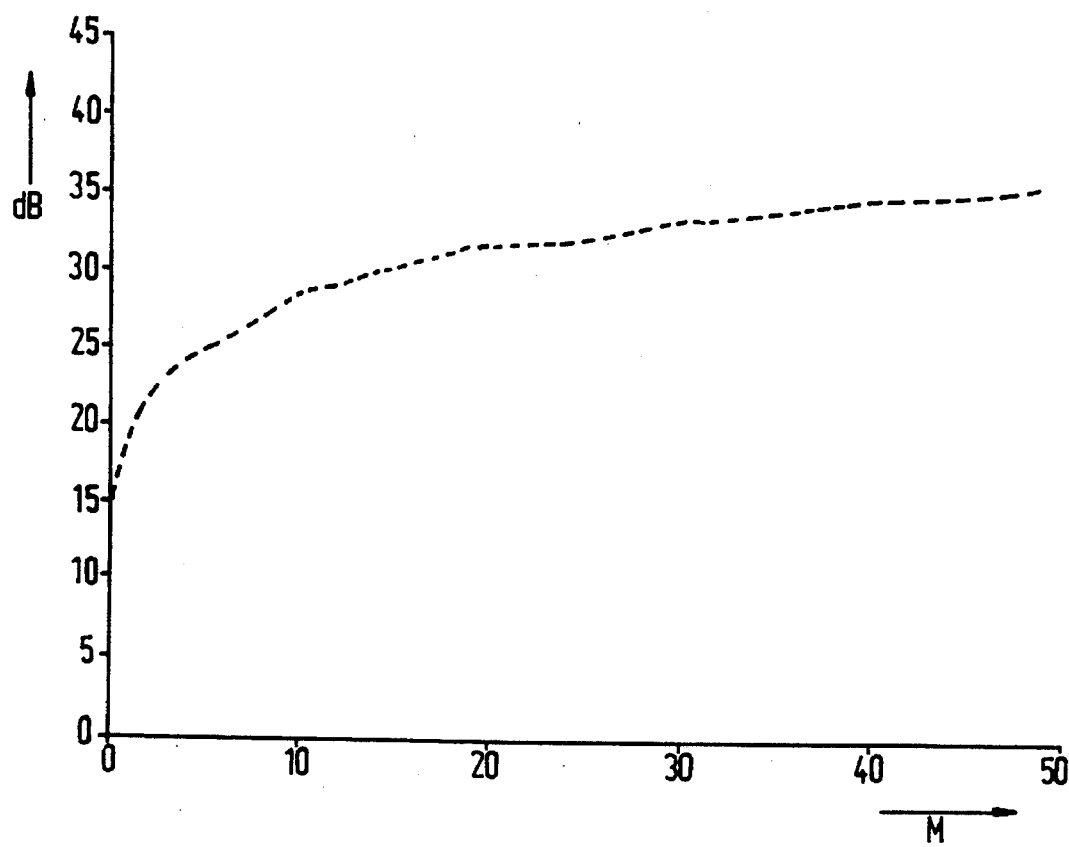
FIG. 4 shows a computed ratio between symbol and distortion energy for a signal in the OFDM receiver.
Figure 5:
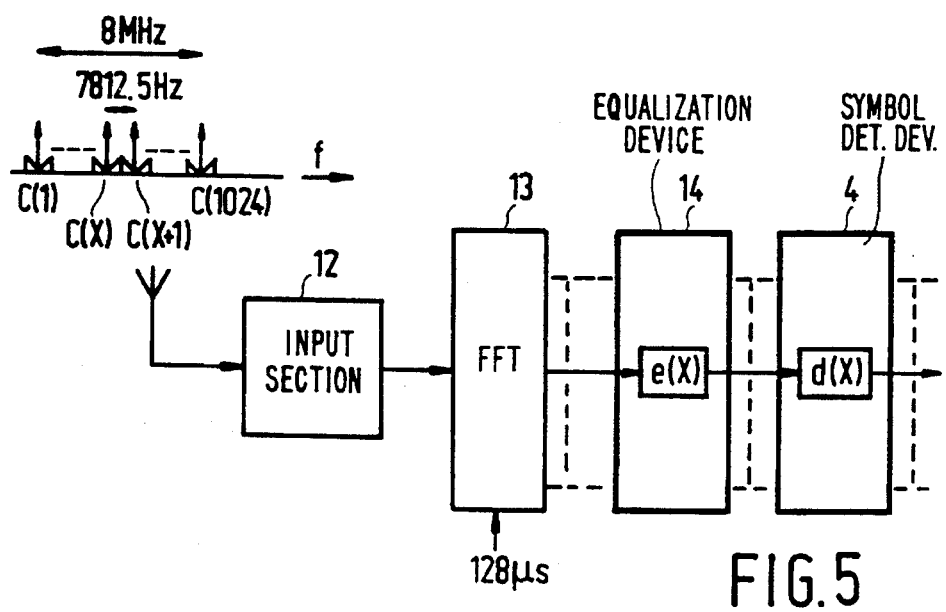
FIG. 5 shows an OFDM receiver including an equalizer.

An illustrative embodiment of the invention used in a television receiver is shown in FIG. 5. The OFDM signal to be received with this receiver originates from various transmitters from an SFN. A realistic assumption for the maximum echo time is, for example, 64 microseconds. The OFDM signal comprises 1024 frequency-sequential careers $c(1) \ldots c(1024)$ over a bandwidth of approximately 8 MHz.

The frequency difference between carrier $c(x)$ and $c(x+1)$ is +7812.5 Hz, which frequency is also the symbol frequency for a carrier. The symbol period is 128 microseconds and is thus not increased by 64 microseconds, as in DAB, so as to prevent echoes in the received signal from leading to distortion at the outputs of the frequency multiplex demodulator.

To transmit data of, for example, video information at a rate of approximately 23 megabits per second, 8 values (3 bits) per symbol will be required. The symbols modulate the phase of a carrier. The transmitted wave packets thus have 8 different phase states, for example, +22.5, +67.5, +112.5, +157.5, −157.5, −112.5, −67.5 and −22.5 degrees.

The input section 12 of the OFDM receiver supplies a stream of complex numbers at the input of the FFT 13, at a rate equal to 1024*7812.5 Number/sec. In a period of 128 microseconds, consecutive sequences of 1024 complex numbers are converted into a position-sequential series of complex numbers at the 1024 outputs of the FFT 13. The complex number at output $s(x)$ of the FFT 13 may be considered as a vector whose angle represents the phase state of a wave packet $g(x,T)$ from carrier $c(x)$. Each FFT output $s(x)$ is further coupled to a symbol detector $d(x)$ of the symbol detection device 4 via an equalizer $e(x)$ of the equalization device 14. A symbol detector $d(x)$ detects that symbol value from a complex number presented to the input whose allocated phase state most closely approximates the demodulated phase state of the wave packet.

Figure 6:
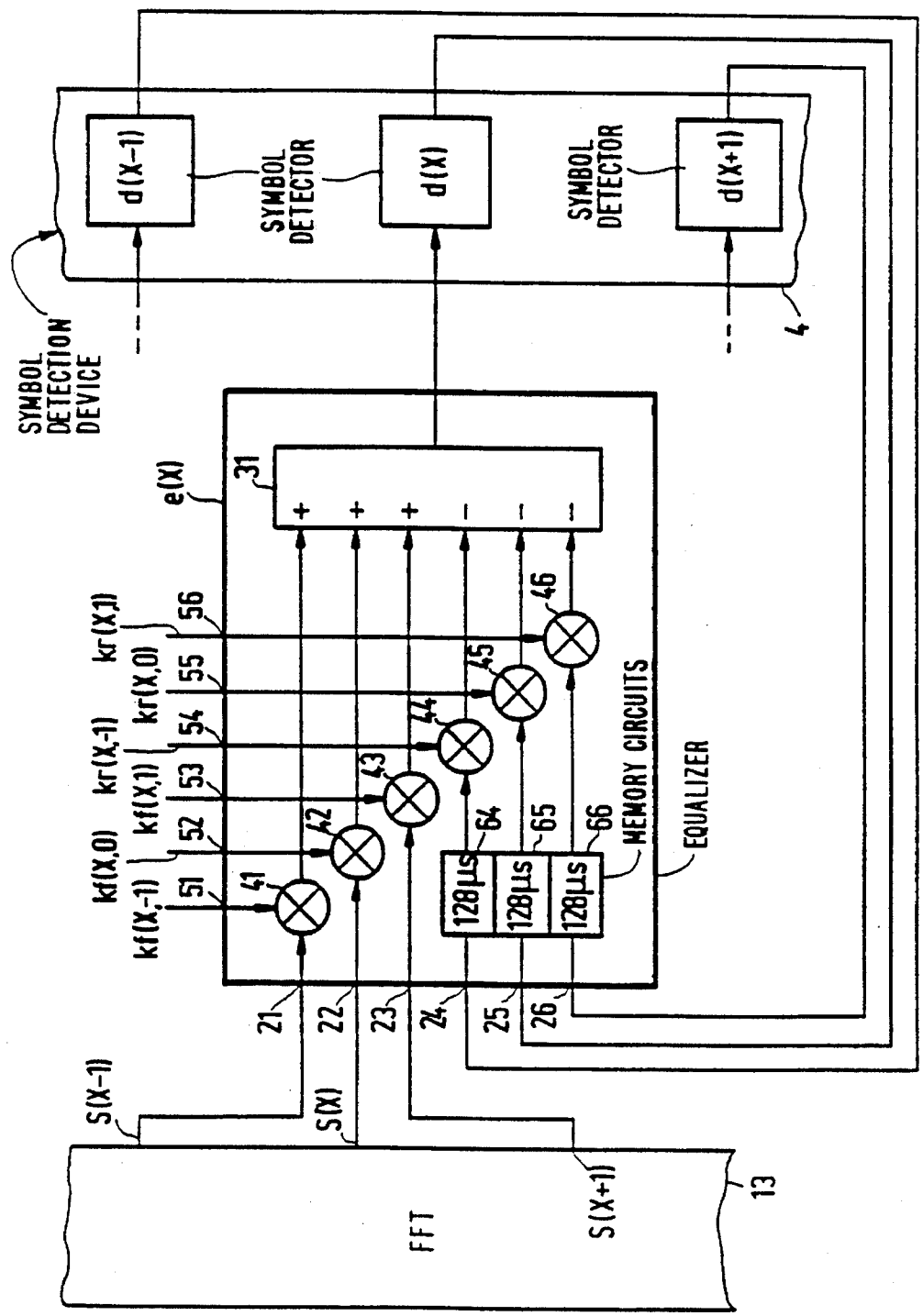
FIG. 6 shows the equalizer in an embodiment of the receiver according to the invention.

FIG. 6 shows an embodiment of equalizer $e(x)$ in greater detail, and the way in which this equalizer is coupled to the FFT 13. The inputs 21, 22 and 23 of equalizer $e(x)$ are coupled to the outputs $s(x-1)$, $s(x)$ and $s(x+1)$, respectively, of the FFT 13. The outputs $s(x-1)$, $s(x)$ and $s(x+1)$ supply the time-quantized demodulated phase states of frequency-sequential carriers $c(x-1)$, $c(x)$ and $c(x+1)$. The inputs 24, 25 and 26 of the equalizer $e(x)$ are coupled to the outputs of the symbol detectors $d(x-1)$, $d(x)$ and $d(x+1)$, respectively. The equalizer output 30 is coupled to the input of symbol detector $d(x)$. The signal path from the outputs $s(x-1)$, $s(x)$, $s(x+1)$ of the FFT 13 to the input of symbol detector $d(x)$ via equalizer $e(x)$ does not incorporate memory circuits. This simple embodiment of equalizer $e(x)$ is preferred because the maximum echo time is shorter than the symbol period.

The equalizer in accordance with the embodiment shown in FIG. 6 comprises six multipliers 41, 42, 43, 44, 45 and 46 which are coupled to the inputs 21, 22, 23, 24, 25 and 26 and to output 30 via a summing circuit 31. The first inputs of multipliers 41, 42 and 43 are coupled to inputs 21, 22 and 23, respectively, of the equalizer $e(x)$, the first inputs of multipliers 44, 45 and 46 are coupled to inputs 24, 25 and 26, respectively, of the equalizer $e(x)$ via memory circuits (>4, 65 and 66, respectively, having a delay time which is equal to the symbol period of 128 microseconds. The second inputs of multipliers 41, 42, 43, 44, 45 and 46 are coupled to inputs 51, 52, 53, 54, 55 and 56, respectively, of the equalizer $e(x)$. The complex numbers $kf(x,-1)$, $kf(x,0)$, $kf(x,1)$, $kr(x,-1)$, $kr(x,0)$, $kr(1)$ are presented to inputs 51, 52, 53, 54, 55, respectively, which complex numbers are the respective coefficients of equalizer $e(x)$.

Dependent on the leading and trailing echoes present at the input signal of input section 12, the coefficients of equalizer $e(x)$ are to be adjusted in such a way that the distortion of the signal at output 30 of the equalizer $e(x)$ is suppressed to a considerable extent with respect to the distortion of the signal at input 22.

Figure 7:
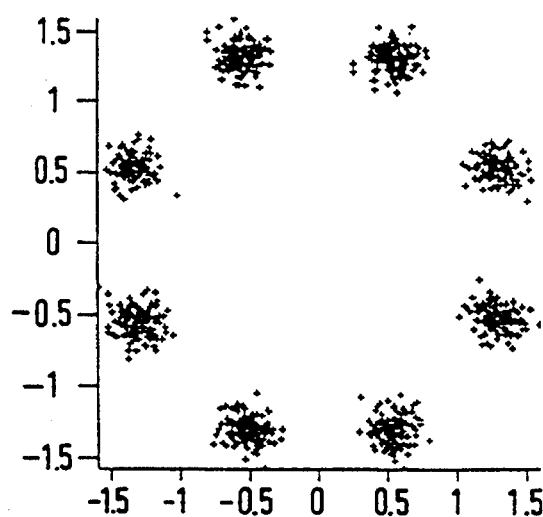
FIG. 7 shows simulation results of a first, simple embodiment of the receiver according to the invention.

FIG. 7 shows the simulation results of a receiver in accordance with an embodiment of the invention as described above. The input signal of the input section 12 has one trailing echo with a time delay which is equal to half the symbol period (64 microseconds) and an amplitude of 30% of that of the main signal. The aforementioned input signal is assumed to be noiseless and the carriers c(1) . . . c(1024) present therein are modulated with arbitrary symbols.

FIG. 7 shows a collection of complex numbers at the 1024 outputs of the equalization device at an arbitrary instant. The horizontal axis in FIG. 7 represents the real part of the complex numbers, while the vertical axis represents the complex part. The complex numbers are clustered around the 8 possible symbol values. The spread in a cluster is the result of distortion due to echoes. The larger the spread, the smaller the energy should be of a noise signal in the input signal for a given error probability at the output of the symbol detection device.

Figure 8:
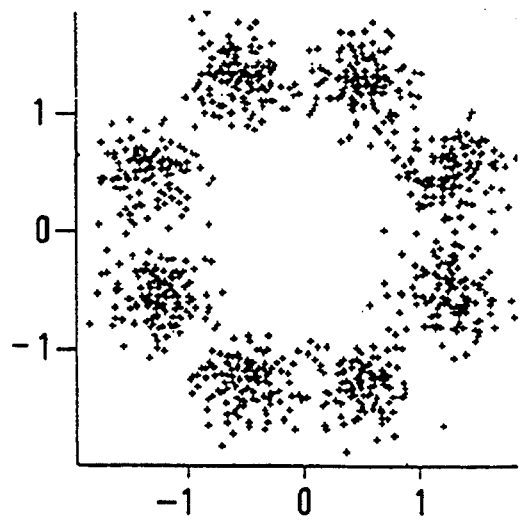
FIG. 8 shows simulation results of an embodiment of the receiver known in the state of the art.

FIG. 8 shows the afore-mentioned collection of complex numbers if no information is applied to the inputs of equalizer e(x), which information is derived from the modulation signal of a plurality of frequency-sequential carriers. In other words: the coefficients $kf(x,-1)$, $kf(x,1)$, $ks(x,-1)$, and $ks(x,1)$ of the embodiment described hereinbefore are set to zero. The spread in the clusters of the afore-mentioned complex numbers has now become so large that errors occur in the detected symbol values at the output of the symbol detection device.

Figure 9:
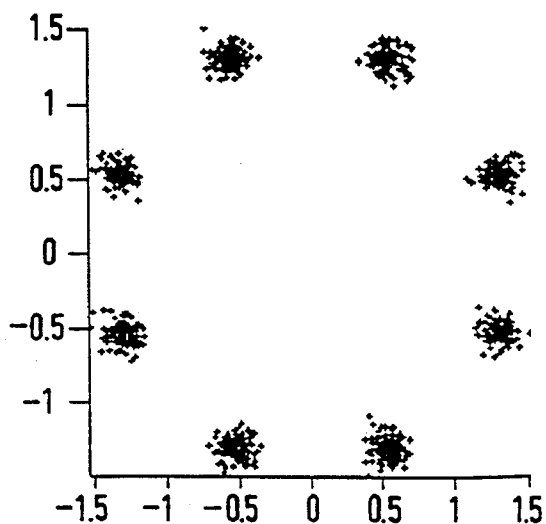
FIG. 9 shows simulation results of a second embodiment of the receiver according to the invention.

FIG. 9 shows the afore-mentioned collection of complex numbers if the equalizer e(x) is provided with fourteen inputs for receiving information from seven frequency-sequential carriers: seven inputs are coupled to seven outputs of the symbol detection device and seven inputs are coupled to seven outputs of the frequency multiplex demodulator.

It will be evident to those skilled in the art that the number of inputs of equalizer e(x) can be extended arbitrarily. It will also be evident that an increase of complexity of equalizer e(x) does not cause a proportional decrease of the permitted noise level at an input signal with echoes for a given error probability.

If the maximum echo times are larger than one symbol period, it will be obvious to delay the input signals of the equalizer over more memory elements in series than is shown in FIG. 6. The outputs of the respective memory elements are then coupled to the summing circuit 30 via a multiplier, with a coefficient at its second input.

The coefficients of equalizer e(x) need not be fixed values, as in the afore-mentioned simulations, but may be adaptively adjusted by means of control loops. Generally, an error signal is derived from the difference between the input signal and the output signal of a symbol detector. The error signal is subsequently applied to a combination circuit together with the part, to be scaled with the coefficient, of the input signal of the symbol detector, which combination circuit supplies an output signal with which the coefficient value is adapted. A multiplier is an obvious combination circuit with which the method described hereinbefore results in a "Least Mean Square Error" control. Methods of adapting a control loop for adaptive coefficient adjustment are further known from literature, for example, from Qureshi S. U. H., "Adaptive Equalization", "Proceedings of the IEEE", vol. 73, no. 9, September 1985, pp. 1349 to 1387.

Figure 10:
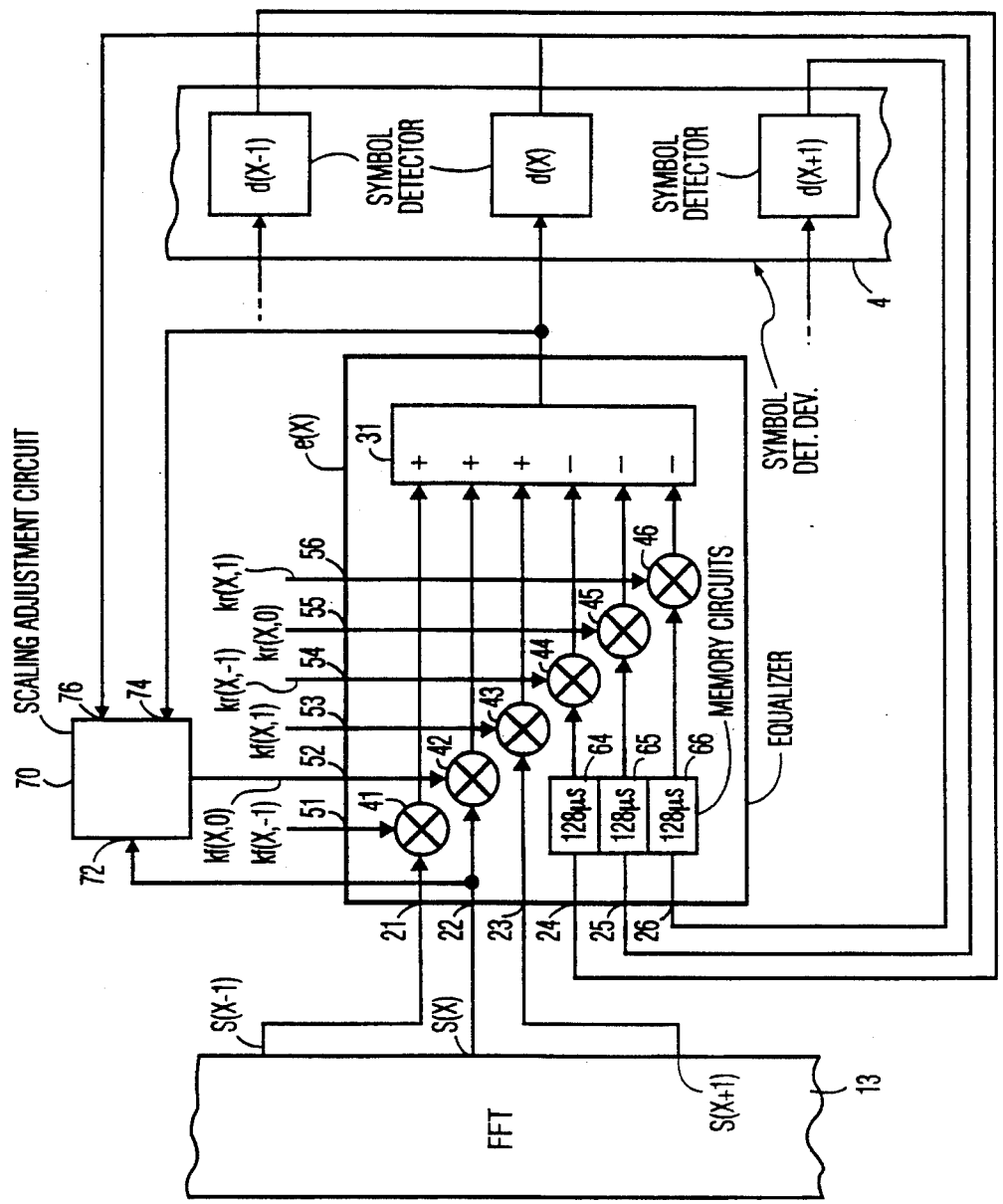
FIG. 10 shows a first modification of the embodiment shown in FIG. 6.

FIG. 10 shows, in block diagram form, the above embodiment. In particular, a scaling adjustment circuit 70 receives the signal applied to input 22 of the equalizer e(x) at a first input 72. The input and output signals of symbol detector d(x) of the symbol detection device 4 are applied, respectively, to a second input 74 and a third input 76 of the scaling adjustment circuit 70. The output 78 from the scaling adjustment circuit 70, which carries the adapted coefficient value, is applied to the input 52 of the equalizer e(x).

By scaling the error signal in a control loop for adaptive coefficient adjustment with a factor, the dynamic properties of this control loop can be optimized. Many error signals and control loops can be distinguished in the equalization device according to the invention and an error signal can be allocated to each symbol detector. Not all error signals need to be scaled by one and the same factor. For example, an error scale factor may depend, for example, on the amplitude of the signal to be equalized or on the properties of the received information, for example, regularly transmitted series of reference and/or calibration data during which series coefficients of the equalization device are adjusted at a faster rate and/or a greater accuracy.

In one embodiment of the invention, it is feasible that the signal processing operations separately presented (FFT, equalization, symbol detection) are combined in, for example, one or several signal processors.

It should be noted that a time multiplex operation of the equalization device and the symbol detection device is preferred, if the data rate of the transmission signal to be received is sufficiently low with respect to the switching speed of the elements of the equalization device. Such a time multiplex operation considerably reduces the hardware complexity. In time multiplex operation, the equalization device 14 as shown in FIG. 5 would require only one equalizer e(x) of the type shown in FIG. 6 and one symbol detector d(x).

An embodiment in time multiplex is evident when the FFT 13 provides a serial output signal, which is common for these type of devices. For an OFDM signal as used in the illustrative embodiment of FIG. 6 previously discussed, a serial output FFT supplies each 128 microseconds a block of 1024 time sequential complex numbers, each complex number representing the modulation signal of a distinct carrier. Thus in contrast to what is shown in FIG. 6, the modulation signals supplied by the FFT are not output multiplexed, but time multiplexed. From the time position of a complex number within a block, it is known to which carrier modulation signal this complex number relates. Most FFT devices supply a serial output signal having blocks of time sequential complex numbers representing the modulation signals of frequency sequential carriers.

Figure 11:
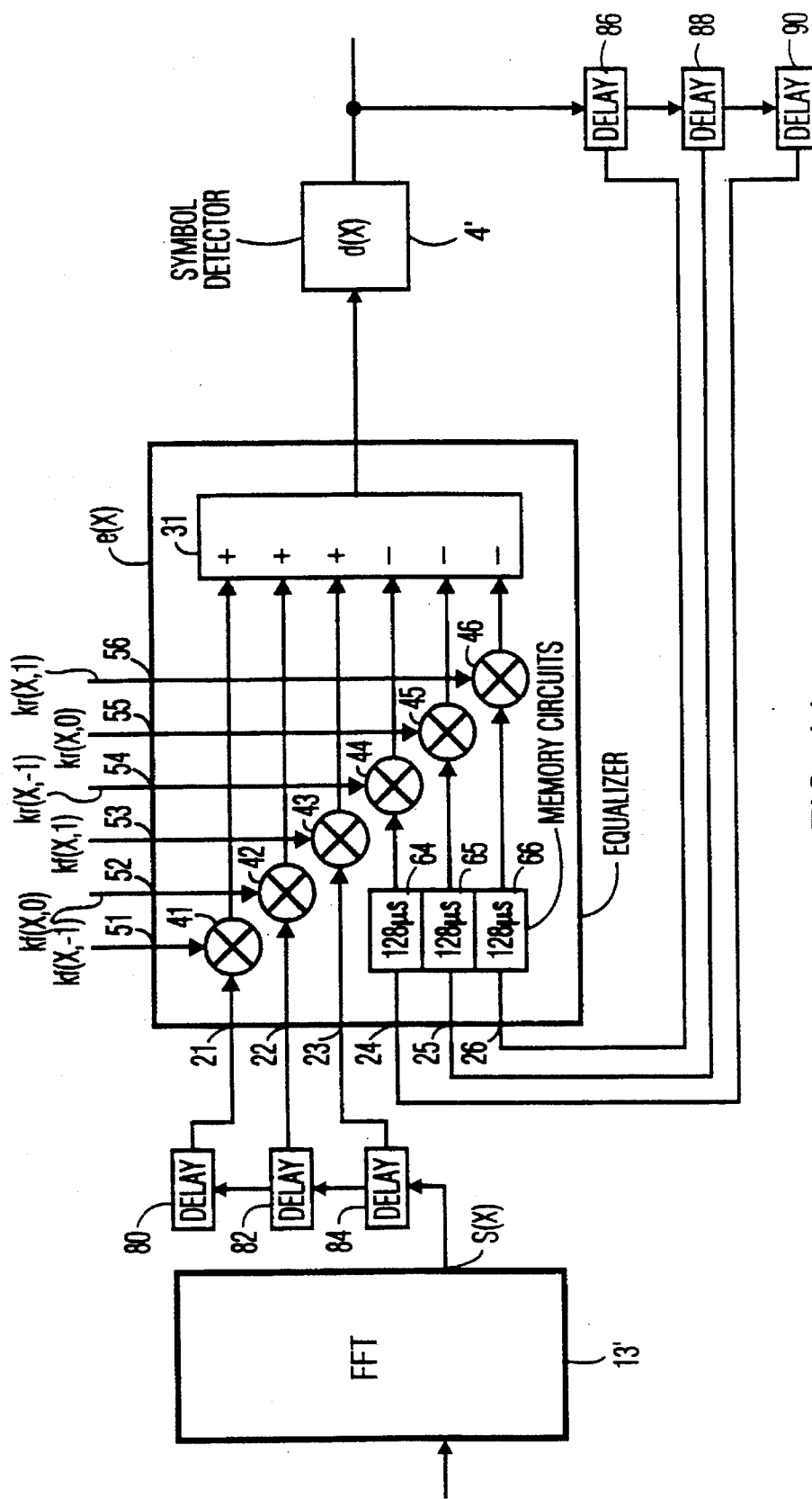
FIG. 11 shows a second modification of the embodiment shown in FIG. 6.

Referring to FIG. 6, if FFT 13 would be replaced by an FFT with a serial output, the constructional modifications of FIG. 11 could be made. To begin with, the FFT 13' has only one output s(x) for supplying a time multiplexed output signal as discussed above to the equalizing device. To convert three time sequential complex numbers into input sequential complex numbers for applying to inputs 21, 22 and 23, delay elements or memories 80, 82 and 84 are used. The symbol detection device 4 also operates in time multiplex and includes only one symbol detector d(x) supplying output data in the form of blocks of 1024 time sequential symbols at a block rate 128 microseconds. By delaying the output signal of d(x) with three serially arranged delay elements or memories 86, 88 and 90, which are substantially the same as delay elements 80, 82 and 84, the data of frequency sequential carriers may be applied to the inputs 24, 25 and 26. However, it would be more efficient to apply the output signal of d(x) directly to all three delay elements 64, 65 and 66, and to offset the delays of these elements with respect to each other, such that their respective outputs supply detected symbols of three frequency sequential carriers to the combining means 31.

In summary, what has been proposed is a receiver for receiving a transmission signal comprising a plurality of frequency multiplexed data modulated carriers, having a good compromise between insensitivity to multipath reception and receiver complexity, and which may enable a reduction in transmission bandwidth and transmitter power. In such a receiver, modulation signals of the carriers are supplied by a frequency multiplex demodulator to a symbol detection device via an equalizer device. The equalizer device compensates distortion in the modulation signals supplied thereto, such that the symbol detection device may detect the transmitted data with reduced error probability. When the transmission signal reaches the receiver with different delay times, this distortion is mainly a kind of cross-talk between the modulation of adjacent carriers. Therefore substantial compensation is achieved by combining the modulation signal of a carrier with signals representative of the data of the adjacent carriers. In the receiver, these signals may be obtained from the multiplex signal path between the frequency multiplex demodulator output and the output of the symbol detection device.

We claim:

1. Receiver for receiving a transmission signal comprising a plurality of N frequency multiplexed data modulated carriers, N being an integer, said receiver comprising:

a frequency multiplex demodulator for demodulating said N frequency multiplexed data modulated carrier and for supplying modulation signals of said N carriers; and a data recovery device having input means for receiving said modulation signals of said N carriers from the frequency multiplex demodulator, and output means for supplying recovered data to further signal processing devices, said data recovery device having a multiplex data recovery signal path between said input means and said output means for carrying a multiplex signal having N signal components, each component representing the data of an individual carrier, said data recovery device comprising an equalization device coupled to said input means, followed by a symbol detection device serially arranged in the multiplex signal path and coupled to said output means, characterized in that the equalization device comprises:

means for supplying groups of M signal components corresponding to the data of M carriers of said N carriers, M being an integer substantially smaller than N; and combining means coupled to said supplying means for combining each respective one of the modulation signals of said N carriers from said frequency multiplex demodulator with one of said groups of M signal components from said supplying means, said one group of M signal components corresponding to the data of M carriers which are frequency adjacent to the carrier corresponding to the respective one of the modulation signals, said equalization device supplying the combined signal components to the symbol detection device, such as to recover the data modulated on said carrier.

2. Receiver as claimed in claim 1, characterized in that said means for supplying groups of M signal components corresponding to the data of M carriers of said N carriers supplies the modulation signals of M carriers of said N carriers from said frequency multiplex demodulator, and said supplying means further comprises feedforward input means for receiving said modulation signals of said M carriers from the frequency multiplex demodulator.

3. Receiver as claimed in claim 1, characterized in that said means for supplying groups of M signal components corresponding to the data of M carriers of said N carriers supplies groups of delayed detected data corresponding to M frequency sequential carriers from the symbol detection device, and said supplying means further comprises decision feedback input means for receiving said groups of delayed detected data corresponding to said M frequency sequential carriers from the symbol detection device.

4. Receiver as claimed in claim 1, characterized in that said means for supplying groups of M signal components corresponding to the data of M carriers of said N carriers supplies the modulation signals of M carriers of said N carriers from said frequency multiplex demodulator, and groups of delayed detected data corresponding to M frequency sequential carriers from the symbol detection device, and said supplying means further comprises feedforward input means for receiving said modulation signals of said M carriers from the frequency multiplex demodulator, and decision feedback input means for receiving said groups of delayed detected data corresponding to said M frequency sequential carriers from the symbol detection device.

5. Receiver as claimed in claim 2, characterized in that the equalization device comprises feedforward scaling means arranged between the supplying means and said combining means for scaling the modulation signals of said M carriers supplied to the combining means.

6. Receiver as claimed in claim 3, characterized in that the equalization device comprises decision feedback scaling means arranged between the supplying means and said combining means for scaling the groups of delayed detected data corresponding to the M frequency sequential carriers supplied to the combining means.

7. Receiver as claimed in claim 5, characterized in that the equalization device comprises scaling adjustment means for adaptively adjusting said scaling, said scaling adjustment means having a first input for receiving an input signal of said scaling means, a second input for receiving the output signal of said combining means supplied to the symbol detection device, and a third input for receiving the detected data in response to said output signal, and means for performing an adjustment of said scaling according to the Least Mean Square Error algorithm.

8. Receiver as claimed in claim 1, characterized in that the frequency multiplex demodulator comprises time multiplexing means for providing time multiplexed modulation signals to said data recovery device of which the multiplex signal path carries time multiplex signal components, and that the equalization device comprises time demultiplexing means preceding said combining means for time demultiplexing said group of M signal components.

9. Data recovery device for recovering data in a plurality of N data signals, where N is an integer, said data recovery device having input means for receiving said N data signals, and output means for supplying recovered data for further signal processing devices, said data recovery device having a multiplex data recovery signal path between said input means and said output means for carrying a multiplex signal having N signal component each component representing one of said N data signals, said data recovery device comprising an equalization device coupled to said input means, followed by a symbol detection device serially arranged in the multiplex signal path and coupled to said output means, characterized in that the equalization device comprises:

means for supplying groups of M signal components corresponding to M data signals of said N data signals, M being an integer substantially smaller than N; and combining means coupled to said supplying means for combining each respective one of the N data signals with one of said groups of M signal components from said supplying means, the M signal components in each of said groups being frequency adjacent to the respective one of said N data signals, said equalization device supplying the combined signal components to the symbol detection device, such as to recover the data.

* * * * *